United States Patent

[11] 3,575,250

| [72] | Inventor | Darwin H. Dykes |
| | | Golden, Colo. |
| [21] | Appl. No. | 786,150 |
| [22] | Filed | Dec. 23, 1968 |
| [45] | Patented | Apr. 20, 1971 |
| [73] | Assignee | Battery Power Unit Co., Inc. |
| | | Golden, Colo. |

[54] SELF-PROPELLED ELECTRIC VEHICLE AND BATTERY MOUNT
16 Claims, 9 Drawing Figs.

[52] U.S. Cl. .................................................. 180/11,
 180/65, 180/68.5
[51] Int. Cl. ...................................................... B62d 59/04
[50] Field of Search ............................................ 180/68.5,
 11, 14, 6.5, 6.2, 65, 64, 70, 27; 74/242.13, 242.15

[56] References Cited
UNITED STATES PATENTS

| 641,514 | 1/1900 | Hunt | 180/6.5 |
| 544,430 | 8/1895 | Frogatt | 180/68.5X |
| 1,165,784 | 12/1915 | Klingelsmith | 180/68.5 |
| 1,789,571 | 1/1931 | Wanamaker | 74/242.15 |
| 2,798,565 | 7/1957 | Rosenthal et al. | 180/6.5 |
| 3,064,744 | 11/1962 | Jennings | 180/6.5 |
| 3,100,547 | 8/1963 | Rosenthal | 180/6.5 |
| 3,437,164 | 4/1969 | Rabjohn | 180/68.5 |

FOREIGN PATENTS

| 21,914 | 9/1908 | Norway | 180/14 |

*Primary Examiner*—Kenneth H. Betts
*Attorney*—John E. Reilly

ABSTRACT: A self-propelled electric vehicle includes a wheeled frame having a quick connect and disconnect hitch for drivingly connecting the vehicle to a variety of wheeled devices. An individual drive for each of a pair of ground-contacting wheels includes a separate, reversible motor and a power transmission train coupled to each wheel which carries an inturned extension over which a transmission member is trained. The motors are mounted on a pivotal base and yieldingly urged away from the wheels to maintain tension in the power transmission train during rotation of the wheels by the motors. A mount for the quick replacement of a battery on the vehicle with a recharged battery has a carrier member on the battery casing and electrical contacts arranged to removably seat on electrically conductive support members carried by the vehicle which are arranged to form power terminals on the vehicle.

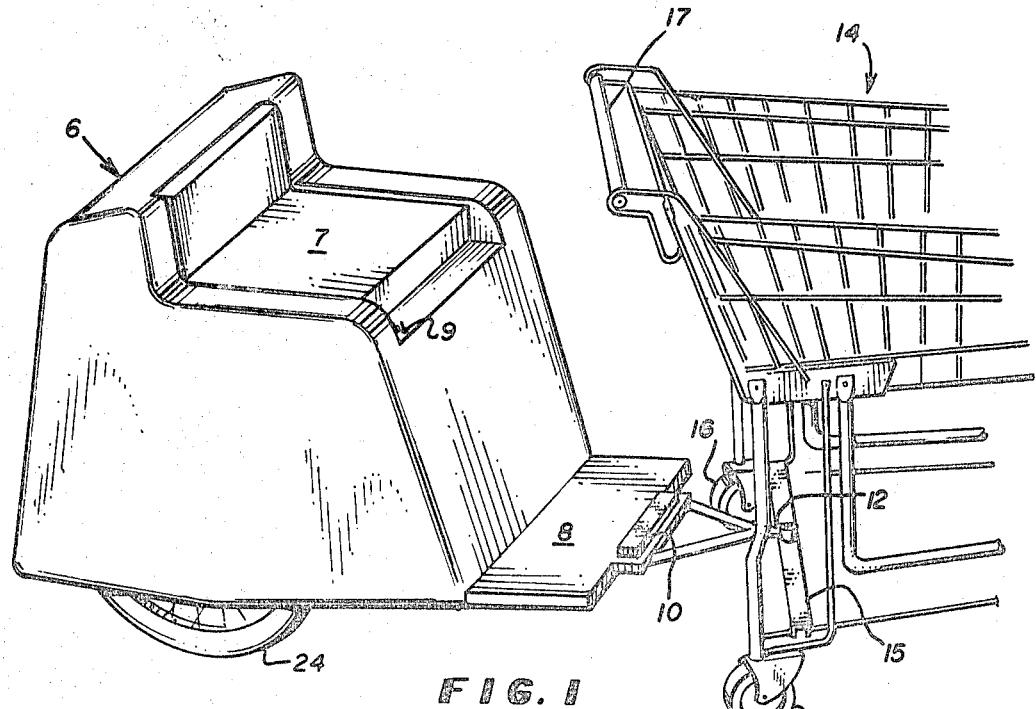
FIG. 1
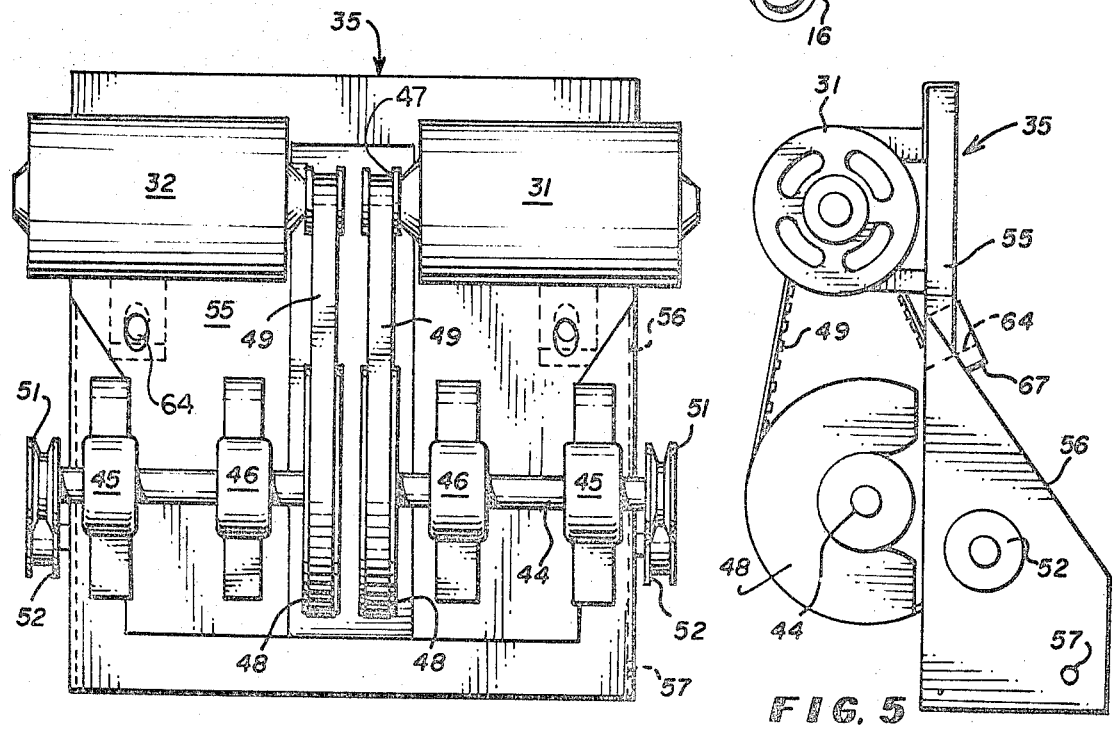
FIG. 4
FIG. 5
INVENTOR.
Darwin H. Dykes
BY
John E. Reilly
ATTORNEY

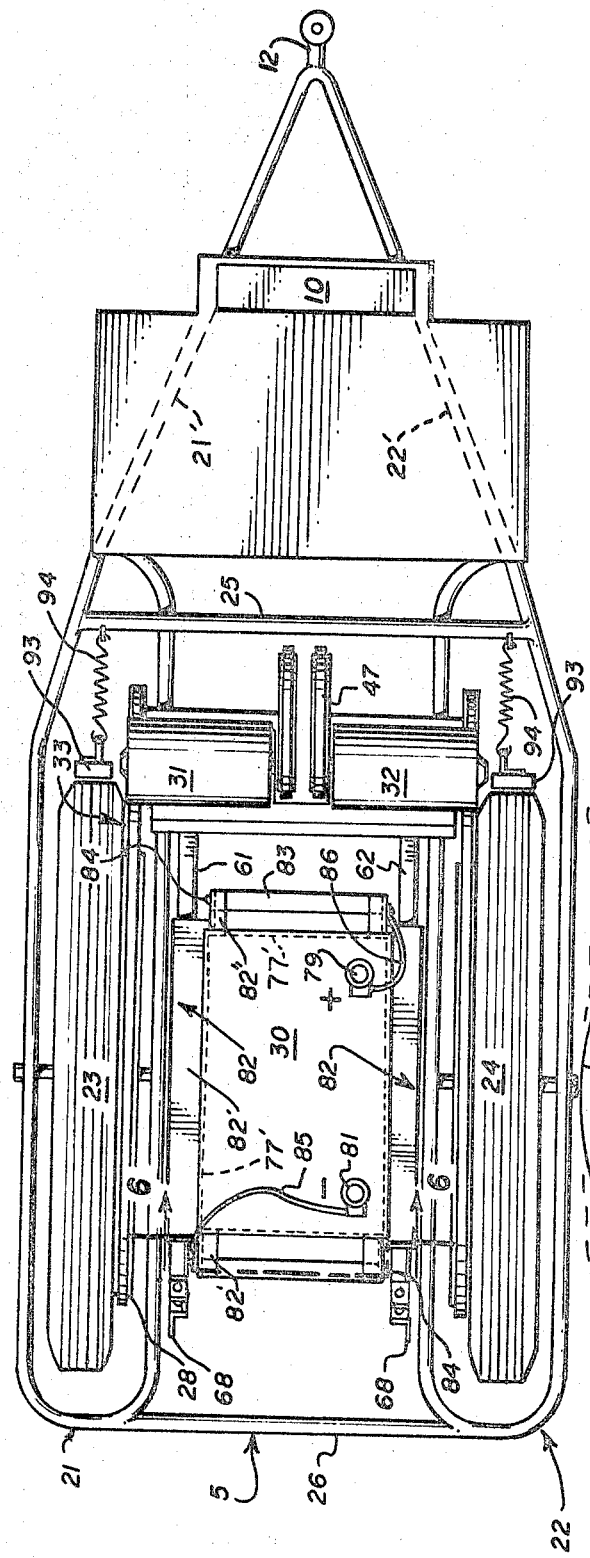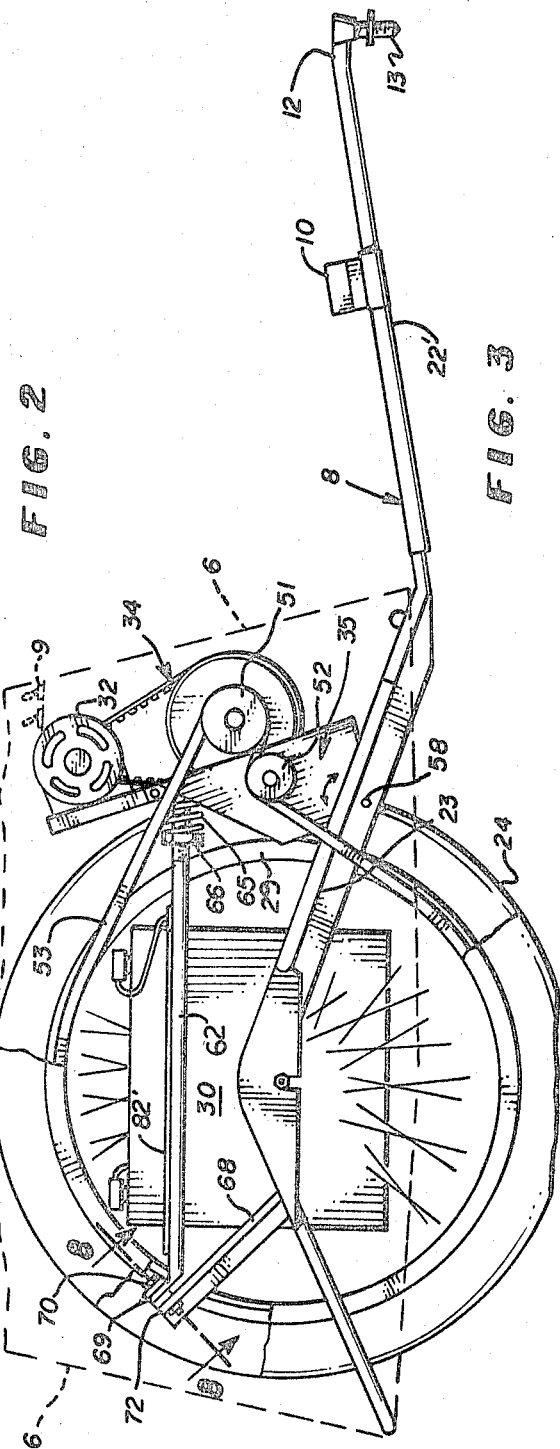

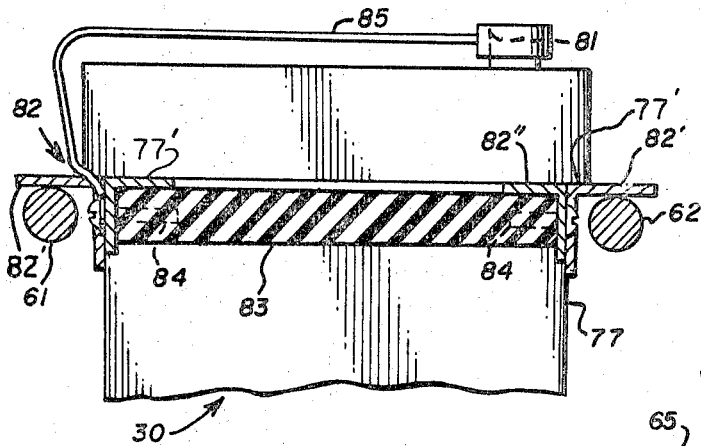
FIG. 6
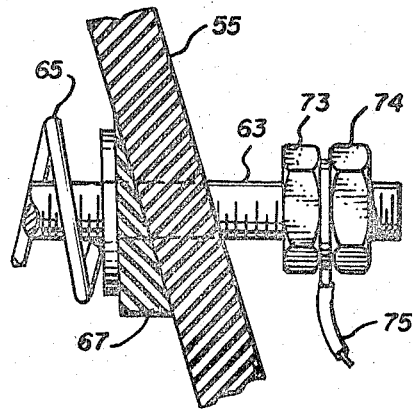
FIG. 7
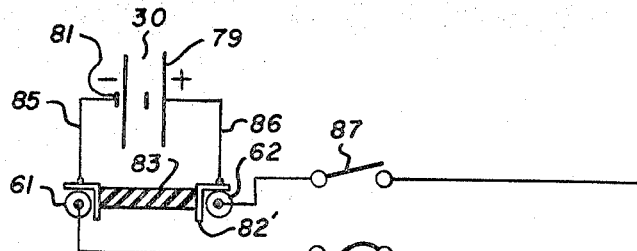
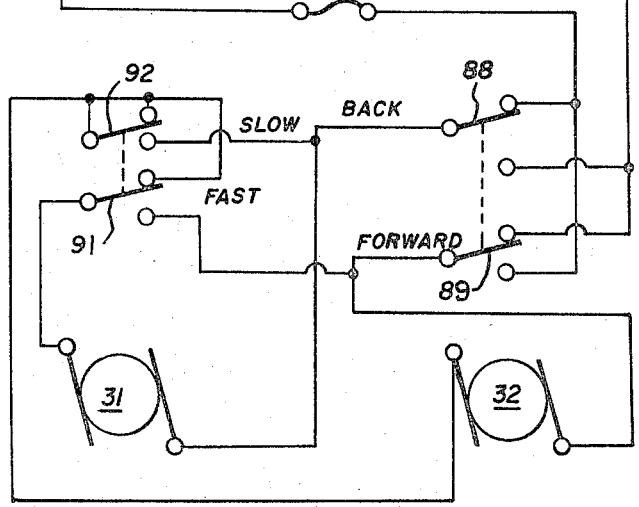
FIG. 8
FIG. 9
INVENTOR.
Darwin H. Dykes
BY
ATTORNEY

SELF-PROPELLED ELECTRIC VEHICLE AND BATTERY MOUNT

This invention relates to a novel and improved electric self-propelled vehicle suitable for moving a wheeled appliance which is commonly pushed or pulled by one person.

There are presently available a wide variety of wheeled appliances such as for example baby strollers, wheel barrows, freight or drum dollies, lawnmowers, golf bags, shopping buggies and the like which are pushed or pulled by one person to move them from one location to another. In many instances it is inconvenient and burdensome to move such devices particularly when the distances between locations become substantial. One problem for any vehicle which utilizes a storage battery is that it is usually difficult and time consuming to recharge the battery or to replace the existing battery with a recharged battery.

Accordingly, it is an object of this invention to provide a new and improved battery mount assembly which permits easy battery removal and replacement with a recharged storage battery on a vehicle.

Another object of this invention is to provide a self-propelled, utility type, electric passenger vehicle which is simple, compact and easy to use for moving a variety of commonly available push or pull type wheeled devices.

It is yet another object of this invention to provide an individually controlled electric-powered drive for each wheel of a self-propelled vehicle including a power transmission member which is trained over inturned extensions of the wheels.

In accordance with the present invention there is provided a vehicle arranged with a hitch to interchangeably couple to and move a wide variety of driven devices and also is capable of carrying a person or load thereon. This vehicle uses an individual drive motor for each wheel and includes an endless transmission member trained over inward extensions of the wheels and a pivotal mount for the motors which is resiliently urged away from the wheels to tighten the endless transmission members. A mount assembly for a battery on the vehicle has an outer carrier member preconnected to the battery electrodes which is adapted to removably seat on spaced supports on the vehicle, the supports having portions which form electric contacts and power terminals on the vehicle for utilization by electric drives and permit quick replacement of recharged batteries as required.

Other objects, advantages and capabilities of the present invention will become more apparent as the description proceeds taken in conjunction with the accompanying drawings, in which:

FIG. 1 is a perspective view showing a self-propelled electric vehicle embodying features of the present invention arranged in a coupled driving relation to a shopping buggy.

Fig. 2 is a top plan view of the electric self-propelled vehicle of FIG. 1 with the fabricated body removed from the frame to show interior parts.

FIG. 3 is a side elevational view of the portion of the vehicle shown in FIG. 2.

FIG. 4 is an enlarged front elevation view of the motor mount and portions of the associated drive train for the vehicle shown in FIGS. 2 and 3 shown as removed from the vehicle.

FIG. 5 is a left side elevational view of the motor mount shown in FIG. 4.

FIG. 6 is an enlarged sectional view taken along lines 6–6 of FIG. 2 showing a mount for the electric storage battery.

FIG. 7 is a fragmentary sectional view showing the forward end portion of one rod member which extends through the base of the motor mount and forms a power terminal on the vehicle.

FIG. 8 is a sectional view taken along lines 8–8 of FIG. 3 to show the attachment of the rear end of the rod with the vehicle; and FIG. 9 is a generally schematic view of one form of motor control circuit for the vehicle.

Referring now to the drawings in FIG. 1 there is shown a self-propelled vehicle which generally includes a wheel-mounted frame 5 having a body preferably of molded fiberglass or the like removably mounted thereon. The body 6 has a seat 7 for supporting supporting a person and a flat footrest 8 on the frame forwardly of the body 6. As shown there is also provided a hand operated switch control station 9 accessible to the driver on the body forwardly of the seat and a foot operated control switch station 10 forwardly of the footrest.

The frame has a hitch or flexible coupling portion 12 at its forward end which includes a downturned threaded portion 13 arranged to fit into a suitable socket on the driven device herein shown as a shopping buggy 14. One preferred way of connecting the hitch 12 to the driven device is by the provision of a crossbar 15 which attaches between the rear wheels 16 of the buggy. The buggy 14 includes an upper handle 17 and forward wheels (not shown). Although a shopping buggy 13 has been used for purposes of illustration it is understood that the driven device could also be other commonly available wheeled appliance such as for example, a baby stroller, a wheel barrow or a freight or drum dolly, a lawnmower, a golf bag, etc. In addition it is understood that a wheeled mechanism or attachment which would be essentially a wheel, frame and handle assembly such as at the rear of the grocery buggy could be used in combination with the vehicle shown for transporting at least one person from one location to another. The body 6 as shown may carry two children and for additional passenger carriage, a platform may be mounted at the rear of the body to support a standing passenger.

With particular reference now to FIGS. 2 and 3 the frame 5 is shown to be constructed of a lightweight tubular material and includes left and right side portions 21 and 22 in the form of closed loops which receive and encompass a pair of ground contacting wheels 23 and 24 mounted for rotation on shafts supported by the side portions. Front and rear cross bracing or crossbars 25 and 26 are disposed transversely of the side portions and are joined, such as, by welding to form a generally box-shaped construction. Forwardly of the side portions the footrest 8 is in the form of a flat plate seated on forwardly convergent extensions 21' and 22' of the side portions. The side portions 21 and 22 are bowed or curved upwardly along their lengthwise extent with the axles for the wheel mounted in the apex area of the side portions.

The wheels 23 and 24 are preferably of a thin-rimmed spoke-type construction and of relatively large diameter such as those commonly found on a bicycle and are provided with inturned extensions formed as sheaves 28 and 29 on the rims of wheels 23 and 24, respectively, to receive the endless power transmission belts described more fully hereinafter with reference to the entire drive for each wheel.

The motive power source of the vehicle includes a battery 30, separate motors 31 and 32 for each wheel and speed reducing, power transmission trains, generally designated by numerals 33 and 34, for driving each of the wheels, the motors and power transmission systems being of identical construction so that a description of one applies to both.

The motors 31 and 32 are supported on a common base or mount 35 disposed forwardly of the wheels. Each of the power transmission trains 33 and 34 comprises an intermediate jackshaft 44 journaled in a pair of spaced bearings 45 and 46 on base 35. A smaller diameter drive pulley or sheave 47 is mounted on the output shaft of the motor and a larger diameter driven sheave 48 is mounted on one end of shaft 44. An endless belt member 49 is trained over sheaves 47 and 48. In turn, sheave 51 is mounted on the jackshaft 44 and an idler sheave 52 is mounted on the outer surface of each side of the base 35. A second endless belt 53 is trained over the output sheave 51, idler sheave 52, and the inturned extension sheave on the associated wheel, and in driving through the sheave system as described, the speed of the electric motor is greatly reduced. Variable speed sheaves may be used for output sheaves 51 to change the power output as for uphill ramps and the like.

The base 35 includes an essentially flat bottom plate 55 and has similar downturned portions 56 on each side which are provided with oppositely disposed apertures 57 adapted to receive a pivot member 58 mounted on each side portion 21 and 22 of the frame so that the base 35 is pivotal about these pivot members. Base 35 is held in a generally upright manner by a pair of generally horizontal elongated rods 61 and 62 carried on the frame which are constructed and arranged on the vehicle to also function as a support for the battery in a manner to be described.

The rods 61 and 62 are of identical construction and each has a threaded end portion 63 which extends through an aperture 64 in the baseplate 55 and a compression spring 65 which is held under compression between a nut 66 threaded on the end portion 63 and a wedge-shaped member 67 on the bottom of the baseplate, the latter compensating for its rearward incline to the vertical. In this manner the springs 65 direct a generally horizontal force forwardly against the base 35 and resiliently urge it in a direction to maintain tension on belts 53 in the above-described power transmission trains.

The rods 61 and 62 which also function as supports for the battery are generally disposed in parallel relation to one another and are spaced apart a sufficient distance to permit the battery to be inserted therebetween and are preferably located centrally of the wheels as shown. Each rod is composed of an electrically conductive material so that its upper surface portion forms an electric contact and its forward threaded end portion 63 forms a power terminal. Each rod is supported in a generally horizontal position lengthwise of the vehicle and is electrically insulated from its associated support structure at both its forward and rear ends.

An upwardly and rearwardly inclined side member 68 is attached to each side of the frame which is arranged to connect with the rear end portions 69 of the rods. An aperture is provided in the flattened and rearwardly inclined end portion 69 of each rod and a larger aperture in the upper end of each side member 68 which align with each other and through which a fastener 70 such as a bolt and nut extends. A spacer 71 of an electrically insulating material is disposed between end portions 69 and side member 68 and another spacer 72 of an electrically insulating material between the end of side member 68 and the fastener 70. The latter insulating spacer has a flanged portion 72' which fits into the aperture in the side member 68 and engages the spacer 71 with the fastener clamping these members together to secure the rear end of the rod in position. The baseplate 55 through which the forward end of the rod extends is also formed of an electrical insulating material such as plexiglass which insulates the front end of the rods from the motors and jackshafts mounted thereon and also from the frame. A pair of locking nuts 73 and 74 are threaded onto the threaded end portion 63 which forms the power terminal on the vehicle and a lead line 75 is secured thereto therebetween which, for the vehicle shown, connects with the motor and control circuit to be described.

The battery 30 illustrated herein suitably may take the form of a commercially available 12 volt battery which includes an outer casing 77 having a flanged portion 77' extending continuously along both an upper portion of both its sidewalls and end walls and a positive electrode 79 and a negative electrode 81 in the form of posts on the top of the casing. The battery has a carrier member mounted thereon which includes identical elongated brackets 82 on opposite sides and handles 83 at opposite ends which interconnect with the ends of the brackets; the brackets being clamped against the sides of the battery by screws 84 which pass through the end portions of the brackets and thread into the handles. As shown, each bracket comprises an intermediate portion 82' which is a length of angle iron or like material having good electrical conducting properties arranged with its upper leg defining a support flange projecting outwardly from the battery and end portions 82'' formed of a shorter length of angle iron or the like being welded at each end of the intermediate portion 82' in a back-to-back relation thereto so that its upper leg projects inwardly along the ends of the battery casing. The handle 83 fits within these oppositely disposed inturned end portions and is spaced a substantial distance from the ends of the battery to permit gripping with the hands. A preferred material for the handles is a plexiglass material which will also serve to electrically isolate the two opposing brackets. Thus the corners of the intermediate portions 82' of the bracket engage the flanged portion 77' of the casing along its sides and the inner ends of the inturned end portions 82'' engage the flanged portion 77' of the casing along its ends.

One of the brackets is electrically connected to the negative electrode 81 of the battery by an electric cable 85 shown as having a clamp engaging the battery electrode and a connector at the opposite end which is held against the bracket by the connecting screw 84. The other bracket is electrically connected to the electrode 79 by a similar cable 86 in the same manner. It is understood that other arrangements may be utilized for connecting the electrodes of the battery to the brackets such as soldering or the like. The outwardly projecting legs of intermediate portions 82' will thus form electric contact and when seated on the rods 61 and 62 they form an electrical connection between an electrode of the battery and an associated power terminal 63 which is then connected to the motor and control circuit so that the battery will be in an operative relation to drive the motor when the battery is seated on the support rods and the proper switches in the control are actuated.

The electrical connections are more clearly shown in the schematic diagram of FIG. 8 wherein the oppositely disposed intermediate bracket portions 82' which are electrically insulated by the handles are shown electrically connecting the electrodes 79 and 81 of the battery 30 to the control circuit and motors shown therein. Thus it is clear that the carrier and battery can then be lifted and removed from the support members without the necessity of connecting and reconnecting the power terminals of the battery thereto as by bolting or the like. In practice it is contemplated that a charged battery and carrier member assembly will be available at a convenient location to replace the existing one on the vehicle.

The control circuit shown in FIG. 8 includes an electric power switch 87 connected between the battery and the reversible traction motors 31 and 32 to stop and start them. This switch is preferably actuated by the foot operated treadle 10. A backward switch 88 and a forward switch 89 are connected on opposite sides of the battery and to the motors 31 and 32 to reverse the polarity of the power to the motors and thereby change their direction of rotation. A "fast" switch 91 and "slow" switch 92 are connected in the circuit between the back and forward switches and the motors. The "fast" switch 91 when moved to the other position connects the motors in parallel with the battery and the "slow" switch 92 in the position shown connects the motors in series with the battery to reduce the voltage thereacross and this reduces the speed to about one-half. The "forward" and "back" switches 88 and 89 and the "slow" and "fast" switches 92 and 91 are preferably located for hand activation at station 9 on the vehicle as shown in FIG. 1. Thus this drive arrangement by using electric traction motors and the hand and foot switch controls the vehicle may easily execute a turn. In turning, one of the motors will load and slow down and the other will speed up in a differential action to assist in the turning of the vehicle. The transmission train between the motors and wheels described may thus be referred to as a differential transmission since the wheels are permitted to be independently rotated by the motors at different speeds in response to the load applied to each of the wheels. A preferred motor rating for motors 31 and 32 is 1/6 Horsepower DC traction motors having a 4000 r.p.m. rating and the battery 30 is a 12-volt storage battery.

The vehicle may be stopped by a mechanical brake associated with each wheel which may be of a variety of types. The brake shown includes a brakeshoe 93 held in spaced relation to the tread of the wheel and attached to a spring 94 supported at one end on the frame. Suitable means such as a lever-operated control may be provided for releasing the tension on the spring 94 to permit it to engage the wheels to stop the vehicle.

Although the present invention has been described with a certain degree of particularity, it is understood that the present disclosure has been made only by way of example and that changes in details of structure and system components may be made without departing from the spirit thereof.

I claim:

1. A battery-powered self-propelled vehicle comprising, in combination, a frame having a hitch and a pair of oppositely disposed spaced support rods of an electrically conductive material carried by the frame and arranged in an electrically insulated relation thereto, each rod having a portion forming a power terminal on the vehicle; a pair of wheels mounted on the frame, each said wheel having an inturned extension to provide a sheave member; motive power means for the wheels including a battery having an outer carrier member, said carrier member having a pair of opposing brackets of an electrically conductive material and handles of an electrical insulating material on each end of the battery interconnecting said brackets, each said bracket being electrically preconnected to one of the electrodes of the battery, said brackets being removably seated on said support rods, said brackets and support rods having contact surfaces in an electrically connected relation with one another to electrically connect one electrode of said battery with one of said power terminals, a reversible electric motor for each wheel, each motor being mounted on a pivotal base held in an upright position by said support rods which extend through said base, said motors being electrically associated with said power terminals, an individual power transmission train coupled between each motor and its associated wheel, said train including an endless member trained over said one sheave member and coupled to an associated one of said motors, and spring means mounted adjacent the forward end portions of said support rods for forcing the base for said motors away from said wheels to maintain maintain tension in said endless members during rotation of the wheels by said motors; and control means electrically connected between said motors and said power terminals for regulating the movement of said vehicle.

2. A vehicle as set forth in claim 1 wherein said hitch is arranged forwardly of the frame and includes a downturned threaded portion adapted to rotate in a member mounted on a wheeled device to couple said frame in a driving relation thereto.

3. A vehicle as set forth in claim 1 wherein there is included a fabricated body mounted on said frame arranged to seat a person for carriage thereon.

4. A vehicle as set forth in claim 1 wherein said control means includes electric switches accessible between the battery and the motors to stop, start, reverse and change the speed of the motors.

5. In a self-propelled vehicle having a frame and power terminal means on the vehicle operatively associated with a drive for the vehicle, a battery support integral with said frame including a pair of spaced substantially parallel support members and a battery-receiving opening between adjacent ends of said support members, a conductive portion on each of said support members defining an electric contact preconnected to said power terminal means, a battery having terminals, an outer carrier member including lifting handle means, a pair of support flanges secured to and extending outwardly from opposite sides of the battery, a conductive portion on each of said support flanges defining an electric contact preconnected to the terminals of the battery, said battery support flanges being removably seated on said support members with said electric contacts between each of said support members and support flanges in engagement with one another to electrically connect said battery terminals with said power terminal means.

6. In a self-propelled vehicle as set forth in claim 5 wherein said battery support members extend longitudinally of the frame and are open for receipt of the battery between the rear ends thereof.

7. In a self-propelled vehicle as set forth in claim 5 wherein said handle means includes a pair of handle members made of electrical insulating material, said handles being connected between the ends of said battery support flanges along opposite ends of the battery.

8. In a self-propelled vehicle as set forth in claim 5 wherein said battery has a casing, and said flanges releasably clampingly engage opposite sides of the battery casing.

9. In a self-propelled vehicle as set forth in claim 5 wherein each of said battery support members is in the form of a rod of an electrical conductive material and each of said support flanges is provided with an electrically conductive bracket having a right-angle cross section with a vertical side leg clampingly engaging the battery and a top leg releasably engaging one of said support rods.

10. In a self-propelled vehicle including a frame, a pair of ground-engaging wheels mounted on the frame, a battery carried by the frame, motor means powered by the battery and a power transmission train for transmitting power from the motor means to the wheels, the combination of a pivotal base supported on the frame adjacent the wheels for supporting said motor means, a battery support integral with said frame including a pair of spaced parallel support member of a conductive material extending longitudinally of the frame between the wheels and open between the rear ends thereof, said support members being electrically insulated from the frame and having terminal portions extending through said base to form power terminals connected to said motor means, means carried on the support members to yieldingly urge said base away from the wheels to maintain tension in said transmission train, a carrier on the battery including a pair of support flanges of a conductive material and preconnected to the battery, said flanges extending outwardly from opposite sides of the battery, said battery support flanges being removably seated on said support members with conductive surfaces thereof in engagement with one another so as to electrically connect said battery with said motor means.

11. In an electric self-propelled vehicle including a frame, an occupant seat above the wheels, a pair of ground-engaging wheels mounted on the frame and a battery, the frame provided with a front coupling portion pivotally connected to a wheeled steerable device to be driven the combination therewith of an individual, variable speed motor in operative association with the battery for independently driving each ground-engaging wheel and differential transmission means including an individual power transmission train in driving relation between said motors and an associated one of said wheels said differential transmission means responsive to differential loading of the ground-engaging wheels in turning the steerable device to cause the wheels to be independently rotated by said motors at different speeds.

12. In a vehicle as set forth in claim 11 wherein said motors are supported on a pivotally mounted base on the frame in a generally upright position adjacent the wheels.

13. In a vehicle as set forth in claim 12 wherein said differential transmission means includes a jackshaft for each motor mounted on the base parallel base parallel to the shaft of the associated motor and belts trained on sheave members on the jackshaft and motor shaft in a driving relation between said motors and said wheels.

14. In a vehicle as set forth in claim 12 including self-adjusting tension means for maintaining tension in said transmission trains.

15. In a vehicle as set forth in claim 14 wherein said tension means includes a pair of spaced electrically conductive battery support members carried by the frame in an electrically associated relation between said battery and said motors, said support members extending forwardly through apertures in said base and having means arranged to hold said base at said upright position.

16. In a vehicle as set forth in claim 15 further including compression springs mounted on the forward end portions of said support members and disposed in a forwardly urging relation with said base.